CONNECTING MEANS FOR ETCHED CIRCUITRY

Original Filed Aug. 1, 1955 2 Sheets-Sheet 1

INVENTOR.
NETARDUS N. BERGER,
BY
ATTORNEY.

June 2, 1959 N. N. BERGER 2,889,393

CONNECTING MEANS FOR ETCHED CIRCUITRY

Original Filed Aug. 1, 1955 2 Sheets-Sheet 2

INVENTOR.
NETARDUS N. BERGER,
BY
ATTORNEY.

United States Patent Office 2,889,393

Patented June 2, 1959

2,889,393

CONNECTING MEANS FOR ETCHED CIRCUITRY

Netardus N. Berger, Los Angeles, Calif., assignor to Hughes Aircraft Company, Culver City, Calif., a corporation of Delaware Original application August 1, 1955, Serial No. 525,439. Divided and this application July 26, 1956, Serial No. 602,950

2 Claims. (Cl. 174—84)

The present invention relates generally to etched circuitry and relates more specifically to a method and arrangement for making electrical connections between etched circuitry and electrical components.

This application is a division of application, Serial Number 525,439, filed August 1, 1955, now abandoned, for a Connecting Means for Etched Circuitry.

In the manufacture of etched circuitry, it is common practice to employ a nonconductive sheet of material having bonded thereto, on each of the planar surfaces thereof, sheets of conductive material such as copper or the like. In order that electrical connections may be established between sheets of conductive material on each of the surfaces of the nonconductive material, it is common practice to punch holes through the conductive and nonconductive sheets and either to plate the surfaces of these holes, to install rivets or eyelets or both therein. When eyelets are employed, these are generally soldered or otherwise permanently secured in place. The actual configuration of the circuitry is established in several ways such as, for example, as by photographically creating a circuit pattern on the sheets and etching with an acid solution, or by physically removing undesired conductive material by other mechanical means.

Considerable difficulty has been experienced in connection with the establishment of connections between etched circuits on each of the sides of the nonconductive plate, due to the difficulties experienced in creating perfect plating within holes through the sheets or maintaining adequate soldered bonds in connection with eyelets, these difficulties being especially prevalent in mass production situations wherein high production rates must be obtained. Additionally, any of the heretofore known usual methods, for establishing connection between circuits on opposite surfaces of plates, are quite time consuming in the manufacture and installation thereof and frequently create high electrical resistance problems which affect the ultimate output functions of the circuit.

Accordingly, it is one important object of the present invention to provide a novel method and arrangement for manufacturing connections between etched circuitry on opposite sides of nonconductive sheets and with leads or the like extending from electrical components.

It is another object of the present invention to provide a method for creating etched circuitry having novel interconnection means between circuits carried by opposite sides of a nonconductive sheet of material.

It is a further important object of the present invention to provide an effective, reliable and efficient means for interconnecting etched circuitry carried by a common plate, such means being susceptible to mass production manufacturing techniques, inexpensive and rapid in use.

Other and further important objects of the present invention will become apparent from the disclosures in the following detailed specification, appended claims and accompanying drawings wherein:

Figure 1:
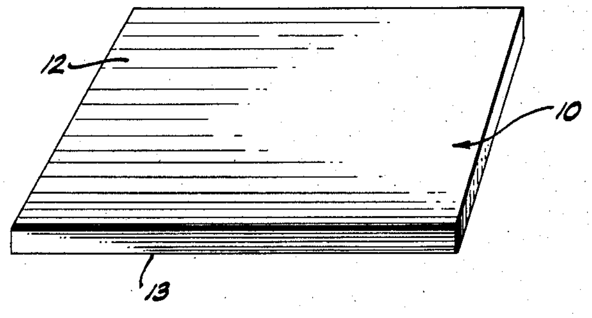
Figure 1 is a perspective view showing the initial configuration of a sheet of nonconductive material.
Figure 2:
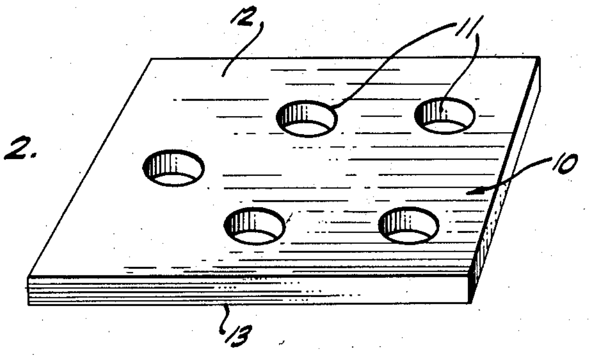
Fig. 2 is a perspective view similar to Fig. 1 showing the nonconductive sheet after having been punched with a plurality of relatively large openings therethrough.

With reference to the drawings, the several figures represent various steps in the method of manufacturing the present connection establishing means. Fig. 1 represents a sheet of electrically nonconductive material, indicated generally at 10, which may be made from any suitable phenolic or plastic substances. As shown in Fig. 2, the sheet 10 is punched with a plurality of relatively large openings 11 that extend through the sheet 10 and interconnect upper and lower planar surfaces 12 and 13 of the sheet. Obviously, the number and arrangement of the openings 11 is a matter of choice depending upon the particular ultimate configuration desired, the arrangement shown in the drawings being for descriptive purposes only and intended in no way to limit the present invention. It is to be understood that the present invention may be applied to circuit connections employing from one to many openings and connections without departing from the spirit and scope hereof.

Figure 3:
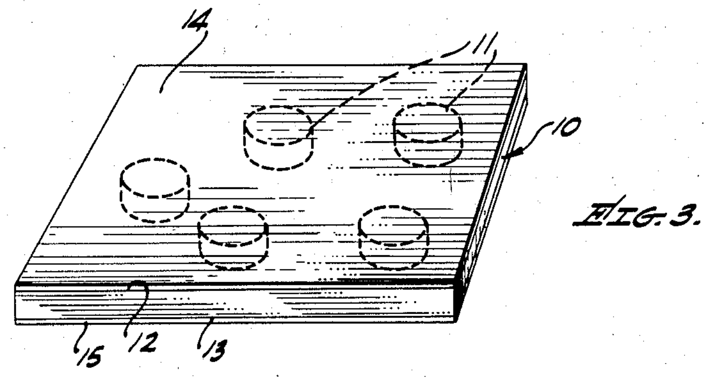
Fig. 3 is a perspective view showing the punched nonconductive sheet after having sheets of conductive material applied and bonded thereto.

As shown in Fig. 3, following establishment of the openings 11 in the sheet 10, two sheets of conductive material, indicated generally at 14 and 15, are disposed respectively on the planar surfaces 12 and 13 of the nonconductive material 10. The sheets 14 and 15 may be made from any suitable electrically conductive material, such as copper for example, and are preferably bonded to the surfaces 12 and 13 as by an adhesive or by a thermo-pressure means, for example. It is to be noted that the sheets 14 and 15 overlie and occlude opposite ends of the plurality of openings 11.

Figure 4:
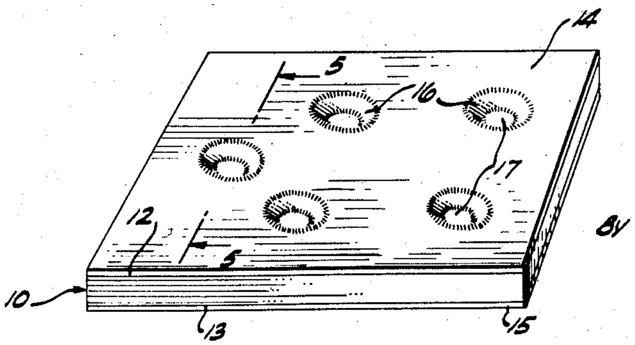
Fig. 4 is a perspective view similar to Fig. 3 showing the portions of the conductive material overlying the openings in the nonconductive material and after having been deformed.
Figure 5:
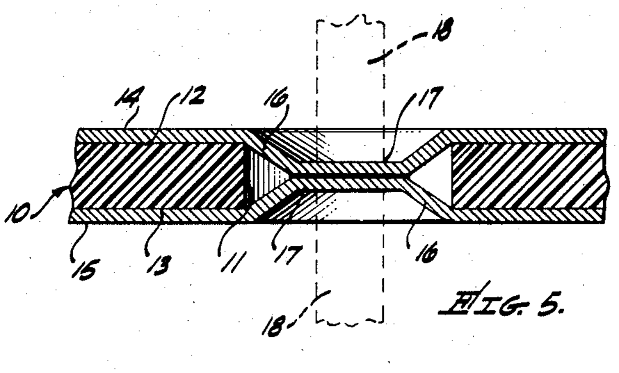
Fig. 5 is an enlarged fragmentary sectional view through one of the openings and associated deformations in the conductive material, as taken substantially as indicated by line 5—5, Fig. 4.

As shown in Fig. 4, the sheets of conductive material 14 and 15 are thereafter deformed as at 16 into generally conical depressions having base surfaces 17 that are substantially parallel to the surfaces 14 and 15. As shown in Fig. 5, the deformations 16 and the portions 17 thereof extend within the confines of the openings 11 a distance substantially equal to one-half the thickness of the nonconductive material 10 and are secured together as by spotwelding or the like as indicated by phantomly shown welding tips 18. The attachment of the sheets may further be accomplished as by soldering or through use of a metallic adhesive. In some instances, no bonding need be present with reliance being placed upon subsequent soldering of components to insure a proper connection between the sheets 14 and 15. Also, the annular triangular space between the deformations 16 and the peripheries of the openings 11 may be filled with a bonding or soldering agent, if desired. Thus, the sheets of material 14 and 15 are electrically interconnected by means of the deformations 16 and through the openings 11 by a substantial amount of conductive material.

Figure 6:
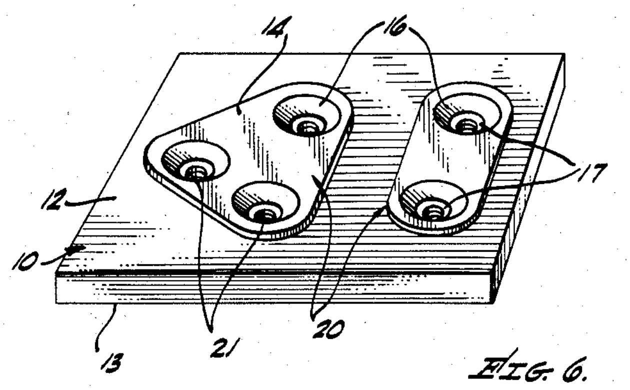
Fig. 6 is a perspective view showing the completed etched circuitry and interconnecting arrangement.

As shown in Fig. 6, the sheets of conductive material 14 and 15 may thereafter be etched into any desired pattern whereby to connect two or more of the openings 11 and the connections established therethrough by interconnecting strips indicated generally at 20. The central areas of the welded and secured portions 17 of the deformations 16 are thereafter provided with relatively small openings 21 therethrough by means of which electrical components may be attached to the circuit.

Figure 7:
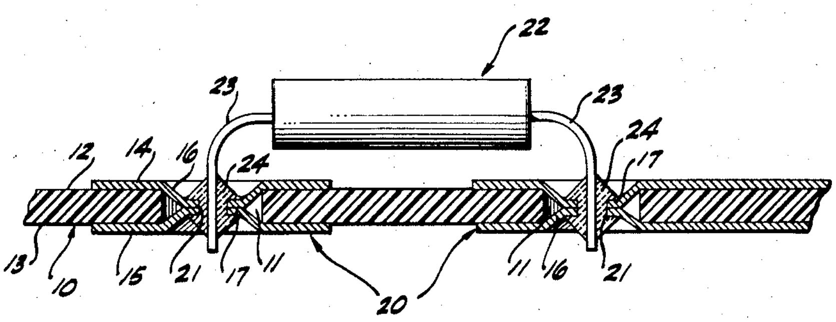
Fig. 7 is an enlarged fragmentary sectional view showing a pair of relatively large openings in the material, the interconnection between circuitry on opposite sides of the material and a typical mounting arrangement for an electrical component.

As shown in Fig. 7, an electrical component, indicated generally at 22 and having leads 23, may be connected to the deformations 16 by means of soldered fillets 24 that are disposed over the areas of the portion 17 of the deformations and through the openings 21 to surround and securely fasten the leads 23 therein. Due to the particular configuration of the present invention and close proximity of the sheets of conductive material on each side of the sheet 10 and within the openings 11, dip type soldering may be used to provide the fillets 24 to considerable advantage.

Thus, it may be seen that adequate and rugged connection may be made with electrical components and etched circuits carried by opposite surfaces of a circuit carrying plate with a minimum of time, effort and experience being required on the part of operators.

It will be recognized that all of the manufacturing steps defined herein may be accomplished practically simultaneously through use of suitable tooling and combined operations.

Having thus described the invention and the present embodiment thereof, it is desired to emphasize the fact that many modifications may be resorted to in a manner limited only by a just interpretation of the following claims.

What is claimed is:

1. A structure for connecting electrical components to etched circuitry disposed on opposite surfaces of a nonconductive sheet of material having a plurality of relatively large spaced openings therethrough and sheets of conductive material secured to outer surfaces thereof, said sheets of conductive material being bonded to said surfaces and having portions etched away thus to define electrical circuit interconnecting conductive strips having portions overlying said relatively large openings, the combination with said conductive strips of: conical deformations in said portions of said conductive strips, said deformations having planar base portions lying in parallel relationship to said strips and disposed within confines of said relatively large openings, said planar base portions in said deformation from said strips on opposite sides of said nonconductive sheet being disposed in contact with each other on a plane disposed at substantially one-half the length of said relatively large openings in said sheet of nonconductive material; a pair of aligned openings through central areas of each of said contacting planar base portions of said deformations; an electrical component lead disposed in each of said pair of aligned openings; means for securing said planar portions together; and means for securing said leads in said pairs of openings.

2. A structure for connecting electrical components to etched circuitry disposed on opposite surfaces of a nonconductive sheet of material having a plurality of relatively large spaced openings therethrough and sheets of conductive material secured to outer surfaces thereof, said sheets of conductive material being bonded to said surfaces and having portions etched away thus to define electrical circuit interconnecting conductive strips having portions overlying said relatively large openings, the combination with said conductive strips of: conical deformations in said portions of said conductive strips, said deformations having planar base portions lying in parallel relationship to said strips and disposed within confines of said relatively large openings, said planar base portions in said deformation from said strips on opposite sides of said nonconductive sheet being disposed in contact with each other on a plane disposed at substantially one-half the length of said relatively large openings in said sheet of nonconductive material; a pair of aligned openings through central areas of each of said contacting planar base portions of said deformations; an electrical component lead disposed in each of said pair of aligned openings; and a common solder fillet disposed about each of said leads, portions of said fillets extending through said openings and over exposed surfaces of said planar base portions of said deformations, whereby simultaneously to secure said leads in said openings, secure opposed deformations to each other and establish a positive electrical connection between said strips and said leads of said components.

References Cited in the file of this patent

UNITED STATES PATENTS 2,649,513 Luhn ---------------- Aug. 18, 1953

OTHER REFERENCES

Publication I "Mass Production Die Stamping of Wired Circuits," published by Franklin Airloop Corporation, 43—20 34 Street, Long Island City 1, N.Y. Copyright 1950 (pages 3 and 4 relied on). Copy in Div. 67, Class 41—Pr. Cir.